A. C. JOHNSON.
TRANSMISSION MECHANISM FOR TRACTORS AND THE LIKE.
APPLICATION FILED JAN. 24, 1916.
1,218,666.
Patented Mar. 13, 1917.
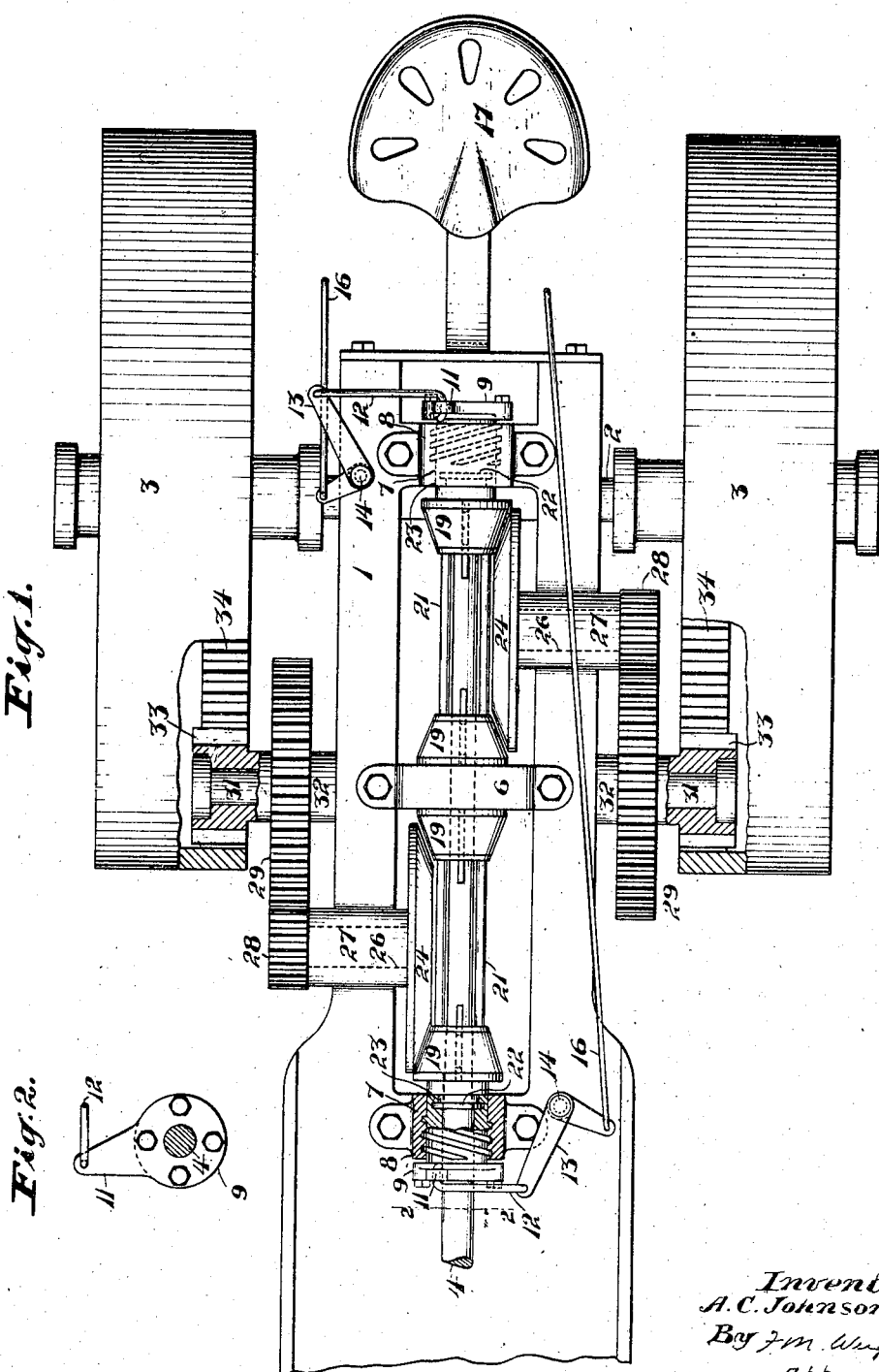
Inventor,
A. C. Johnson,
By J. M. Wright
Attorney

UNITED STATES PATENT OFFICE.

ALFRED C. JOHNSON, OF WINTERS, CALIFORNIA.

TRANSMISSION MECHANISM FOR TRACTORS AND THE LIKE.

1,218,666. Specification of Letters Patent. Patented Mar. 13, 1917.

Application filed January 24, 1916. Serial No. 73,840.

*To all whom it may concern:*

Be it known that I, ALFRED C. JOHNSON, a citizen of the United States, residing at Winters, in the county of Yolo and State of California, have invented new and useful Improvements in Transmission Mechanism for Tractors and the like, of which the following is a specification.

My invention relates to improvements in transmission mechanism for tractors and the like, the object of my invention being to provide simple mechanism for tractors by which they can be easily reversed, when required, and can also be turned in either direction so as to make a very quick turn.

In the accompanying drawing, Figure 1 is a broken plan view of a tractor constructed in accordance with my invention; Fig. 2 is a detail sectional view through the line 2—2 of Fig. 1.

Referring to the drawing, 1 indicates the body of a tractor and 2 the rear axle thereof, upon which are independently mounted two traction wheels 3. These wheels are shown of the simplest form, the character of the wheels being immaterial to my invention. 4 indicates the driving shaft of the motor, not shown, of the tractor, which extends through a central bearing 6. On each side of said bearing said shaft also extends through a sleeve 7, threaded on the outside, to turn in an internally threaded bearing 8 secured to the body of the tractor. Each sleeve 7 has secured thereto, on the side remote from the bearing 6, a collar 9 from which extends an arm 11, the outer end of which is apertured and is engaged by a hook-shaped end of a link 12 connected to one end of a bell crank lever 13, pivoted on said body, as shown at 14, the other end of which is connected to a rod 16 leading to a point convenient for manipulation by the driver of the tractor seated on a seat 17. By moving said rod longitudinally the threaded sleeve is turned in one direction or the other and is thereby moved longitudinally in one direction or the other upon the driving shaft. Upon said shaft, on each side of said bearing 6, are also mounted a pair of friction cones 19, keyed to the shaft but slidable thereon, and connected with each other by rods 21, so that the cones of each pair move together longitudinally. The outer cone of each pair is formed with a clutch ring 22 which engages a companion clutch ring 23 on the threaded sleeve, the effect being that said outer cone, and therefore also the inner cone, are compelled to move longitudinally on the shaft with the threaded sleeve, although they do not rotate therewith. By the longitudinal movement of the threaded sleeve, either of the attached pair of cones is adapted to engage a friction cone 24 on a transverse shaft 26 in a bearing 27 formed on the body of the tractor, said shaft 26 carrying at its outer end a pinion 28 which meshes with a gear wheel 29 on a shaft 31 rotating in a bearing 32 extending through the body of the tractor, the outer end of which shaft 31 carries a pinion 33 which meshes with an internal gear wheel 34 formed on the inner surface of one of the traction wheels.

Since each pair of cones is thus operatively connected to one or the other of the traction wheels, and the friction cones of each pair are arranged to alternately and exclusively engage the friction cone 24 and since each pair of cones can be operated independently of the other pair, it results that either traction wheel can be rotated in either a forward or a rearward direction independently of the other. When it is desired to go straight ahead, both traction wheels are rotated in a forward direction, and when to reverse, both of them are rotated in a rearward direction. If it is desired to turn to the right, the left-hand traction wheel is rotated in a forward direction while the right-hand traction wheel is rotated in a rearward direction, and conversely if to the left. Thus it will be seen that very sharp turns can be made by my improved tractor.

I claim:—

1. In combination, a driving shaft, two pairs of friction cones rotatable with and slidable on said shaft, the cones of each pair being connected to move together on said shaft, a friction cone for each pair, adapted to be engaged by one or the other of the cones of said pair, traction wheels, operative connections between said traction wheels and the last-recited cones respectively, and means for moving either pair of said cones independently on said shaft, to cause one or the other of the cones of said pair to engage the second named friction cones.

2. In combination, a driving shaft, two pairs of conical transmission devices rotatable with and slidable on said shaft, the devices of each pair being connected to move together on said shaft, a conical transmission device for each pair, adapted to be engaged by one or the other of the devices of said pair, traction wheels, operative connections between said traction wheels and the last-recited devices respectively, and means for moving either pair of said devices indpendently on said shaft, to cause one or the other of the devices of said pair to engage the second-named devices.

3. In combination, a driving shaft, two pairs of friction cones rotatable with, and slidable on, said shaft, rods connecting the cones of each pair so that they move together on said shaft, a friction cone for each pair, adapted to be engaged by one or the other of the cones of said pair, traction wheels, operative connections between said traction wheels and the last-recited cones respectively, and means for moving either pair of said cones independently on said shaft, to cause one or the other of the cones of said pair to engage the second-named friction cones.

In testimony whereof I have hereunto set my hand in the presence of two subscribing witnesses.

ALFRED C. JOHNSON.

Witnesses:
F. M. WRIGHT,
D. B. RICHARDS.

Copies of this patent may be obtained for five cents each, by addressing the "Commissioner of Patents, Washington, D. C."